United States Patent [19]

Chaney

[11] Patent Number: 5,042,516
[45] Date of Patent: Aug. 27, 1991

[54] FILTER WASHING APPARATUS
[76] Inventor: Wayne Chaney, 8492 N. 7th St., Terrebonne, Oreg. 97760
[21] Appl. No.: 588,950
[22] Filed: Sep. 26, 1990
[51] Int. Cl.$^5$ .............................................. B08B 9/00
[52] U.S. Cl. ................................ 134/169 R; 134/191
[58] Field of Search ............... 134/169 R, 169 A, 170, 134/900, 147, 149, 191, 195; 68/189; 210/258, 416.1, 416.2

[56] References Cited
U.S. PATENT DOCUMENTS

| | | | |
|---|---|---|---|
| 3,583,413 | 6/1971 | Mertzanis | 134/94 |
| 3,613,700 | 10/1971 | Werth et al. | 134/57 R |
| 3,665,547 | 5/1972 | Boylan | 15/406 |
| 3,765,051 | 10/1973 | Wanat | 15/302 |
| 3,780,747 | 12/1973 | Stadie et al. | 134/43 |
| 3,820,552 | 6/1974 | Lang et al. | 134/113 |
| 4,067,749 | 1/1978 | McKinney | 134/21 |
| 4,299,245 | 11/1981 | Clapper | 134/140 |
| 4,417,596 | 11/1983 | Pahlen | 134/152 |

Primary Examiner—Philip R. Coe
Attorney, Agent, or Firm—Dellett, Smith-Hill and Bedell

[57] ABSTRACT

To provide an inexpensive, portable, and easy to use apparatus for applying a detergent to a used hot tub or other filter, a tank is provided with a submersible pump and has a large perforated tube affixed to its bottom. The filter to be cleaned is placed over this large tube. A readily disconnectable arrangement of tubing terminates in a small perforated tube at a first end and is connected to the outlet of the submersible pump at a second end. The large perforated tube is provided with a collar to keep the filter from floating and to prevent undesirable current flows around rather than through the filter. The small perforated tube fits within the large perforated tube after the filter and collar are in place. When a detergent solution is placed in the tank and the submersible pump is activated, the detergent solution moves from a region in the tank that is exterior to the filter, through the pump and readily disconnectable arrangement of tubing to a region interior to the small perforated tube, through the perforations in the small perforated tube to a region that is exterior to the small perforated tube and interior to the large perforated tube, then through the perforations in the large perforated tube to a region that is exterior to the large perforated tube and interior to the filter to be cleaned, and then through the filter to be cleaned and back to the region in the tank that is exterior to the filter.

4 Claims, 1 Drawing Sheet

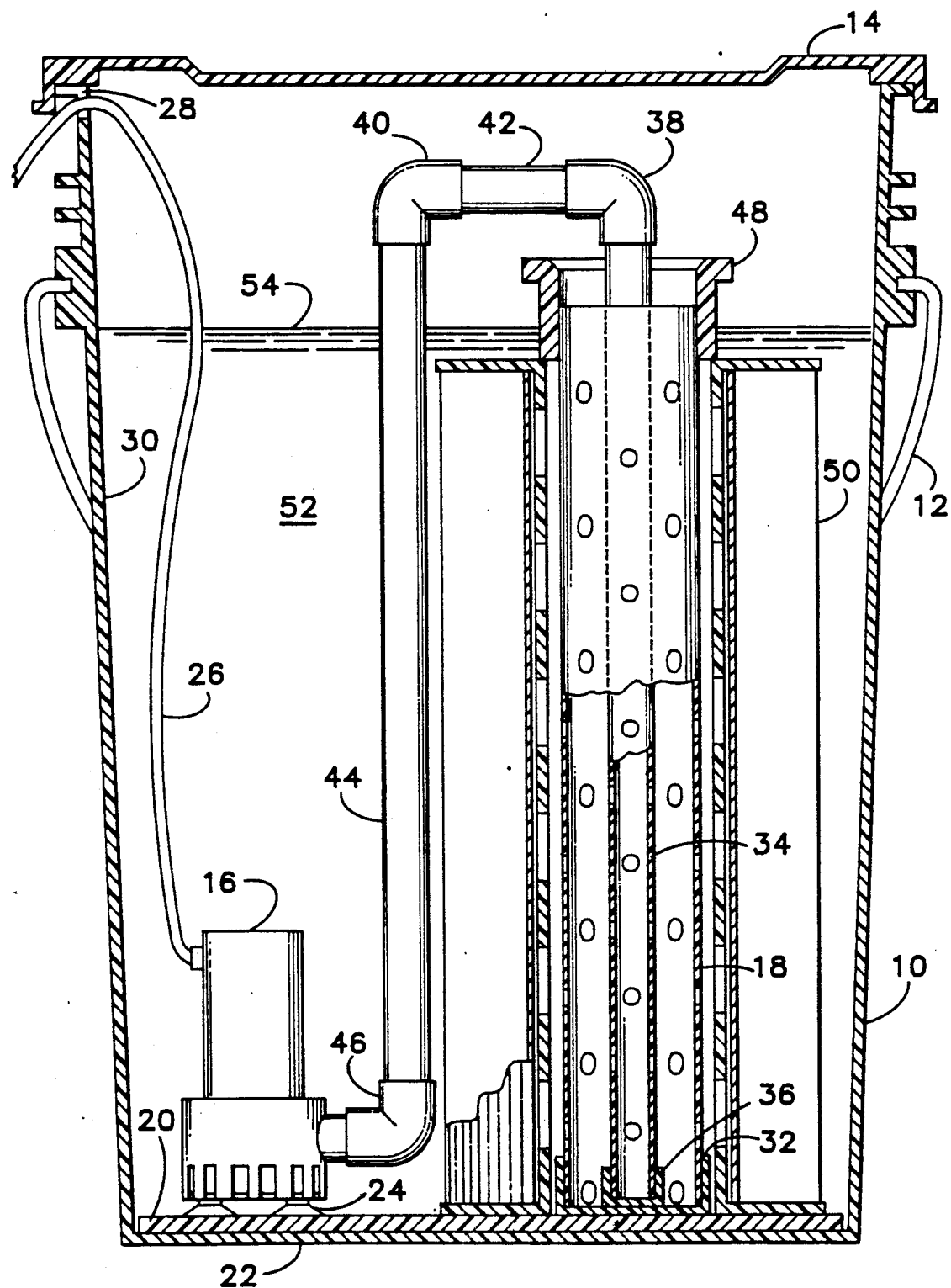

5,042,516

FILTER WASHING APPARATUS

Background of the Invention

This invention relates to the field of cleaning hot tub filters, and more particularly to the field of inexpensive, portable, and easy to use apparatuses for applying a detergent to a used hot tub filter to remove accumulated body oils and thereby rejuvenate the filter for further use.

Because of the fairly high temperatures that most people use for their hot tubs, the body is constantly perspiring while it is immersed in the hot tub. This under-water perspiration, while not noticeable directly, carries a lot of skin oils out of the pores of the human body and into the water in the hot tub. These oils collect in the filter, slowly turning it dark and oily. Eventually, after weeks of accumulated use, these filters must be replaced or cleaned, both for sanitary reasons and to allow for the effective flow of water through them. For those who use a hot tub regularly, several times a week, either socially or for medical reasons, filter replacement is 40–60% of the ongoing operating costs of maintaining the hot tub.

A variety of systems and devices for cleaning filters have been disclosed in the prior art. For example, U.S. Pat. Nos. 4,417,596 to Pahlen for a "Portable Apparatus for Cleaning Re-usable Filters" and 3,820,552 to Lang et al for a "Filter Cartridge Cleaner" both have a region of concentrated nozzles and the filter is passed back and forth through this region until it is clean. Both of these devices require active operation by an operator.

In addition, U.S. Pat. No. 4,299,245 to Clapper for a "Filter Cleaning System" discloses a relatively complex arrangement of nozzles and a turntable for rotating the filter through them. Sprays are directed against both the inside and outside of the filter, without regard to the normal direction of flow. Using this apparatus does not require an operator's continuous attention, but the complexity of the design prohibits inexpensive construction and therefore puts such an apparatus out of the economic reach of a low budget hot tub owner.

What is desired is an inexpensive, portable, and easy to use apparatus for applying a detergent solution to a used hot tub filter to remove accumulated body oils and thereby rejuvenate the filter for repeated use.

SUMMARY OF THE INVENTION

A tank is provided with a submersible pump and has a large perforated tube affixed to its bottom. The filter to be cleaned is placed over this large tube. A readily disconnectable arrangement of tubing terminates in a small perforated tube at a first end and is connected to the outlet of the submersible pump at a second end. The large perforated tube is provided with a collar or other means to keep the filter from floating and to prevent undesirable current flows around rather than through the filter. The small perforated tube fits within the large perforated tube after the filter and collar are in place.

When a detergent solution is placed in the tank and the submersible pump is activated, the detergent solution moves from a region in the tank that is exterior to the filter, through the pump and readily disconnectable arrangement of tubing to a region interior to the small perforated tube, through the perforations in the small perforated tube to a region that is exterior to the small perforated tube and interior to the large perforated tube, then through the perforations in the large perforated tube to a region that is exterior to the large perforated tube and interior to the filter to be cleaned, and then through the filter to be cleaned and back to the region in the tank that is exterior to the filter.

It is an object of the present invention to provide an inexpensive, portable and easy to use apparatus for applying a detergent to a used hot tub filter to remove accumulated body oils and dirt and thereby rejuvenate the filter for further use.

The subject matter of the present invention is particularly pointed out and distinctly claimed in the concluding portion of this specification. However, both the organization and method of operation, together with further advantages and objects thereof, may best be understood by reference to the following detailed description and accompanying drawing.

BRIEF DESCRIPTION OF THE DRAWING

The drawing Figure is a partially cut away cross-sectional view of the filter washing apparatus of the present invention.

DETAILED DESCRIPTION

Referring now to the Figure, a plastic bucket 10, having a handle 12 and lid 14, has been provided with a submersible pump 16 and a large perforated plastic tube 18. The submersible pump 16 is removably attached to a plastic plate 20 on the bottom 22 of the plastic bucket 10 by a plurality of rubber suction cups 24 affixed to the bottom of the submersible pump 16. A power cord 26 provides low voltage dc power from a source external to the plastic bucket 10. Optionally, a notch 28 is provided in side 30 of the plastic bucket 10 to accommodate the power cord 26, but such is not required because the lid 14 can simply be left loose to accomplish the same purpose. The submersible pump 16 is suitably a 300 gallon per hour, 12 Volt, 1.5 Amp fish tank aerator pump.

The large perforated plastic tube 18 rests in an accommodating large plastic tube cap 32 that is also affixed to the plastic plate 20, e.g. by non-soluble glue. A large plastic collar 48 is slideably fitted to the top of the large perforated plastic tube 18. A small perforated plastic tube 34 fitted with small plastic tube cap 36 at its bottom end rests within the large perforated plastic tube 18 on the large plastic tube cap 32. The small plastic cap 36 ensures that liquid entering the small perforated plastic tube 34 exits through the perforations rather than through this end of the small perforated plastic tube 34.

The small perforated plastic tube 34 is connected to the outlet of the submersible pump 16 by a readily disconnectable arrangement of plastic tubing comprising plastic tube elbows 38 and 40, short plastic tube 42, long plastic tube 44, and rubber elbow 46. This arrangement of plastic tubing is readily disconnectable because the short plastic tube 42 is slideably fitted into plastic tube elbows 38 and 40 loosely enough to permit easy connect and disconnect by hand, and because of the flexibility of the rubber elbow 46 which affords plenty of "wiggle room" to facilitate disconnection.

The filter washing apparatus of the present invention, in the embodiment described above, operates as follows. The lid 14 is removed from the plastic bucket 10. Short plastic tube 42 is disconnected from plastic tube elbow 38. The plastic elbow 38 and small perforated plastic tube 34 with plastic cap 36 are lifted out of large perforated tube 18 and temporarily put aside. The short plastic tube 42 and plastic elbow 40 are then rotated on long plastic tube 44 until short plastic tube 42 is at approximately a right angle to the position shown (i.e., pointing into or out of the Figure). The large plastic collar 48 is removed from the top of the large perforated plastic tube 18.

The filter 50 to be washed is now placed over the large perforated plastic tube 18 so that it rests on the plastic plate 20 at the bottom of the plastic bucket 10. The large perforated plastic tube holds the filter in place, and is held in place itself by the large plastic cap 32 which is glued to the bottom of the plastic bucket 10. The large plastic collar 48 is next put back on the top of the large perforated plastic tube 18 to keep the filter from floating when the plastic bucket 10 is filled with liquid. The small perforated plastic tube 34, along with small plastic cap 36 and plastic elbow 38, is then placed inside of the large perforated plastic tube 18. The short plastic tube 42 is then rotated back to the position shown and reconnected to plastic tube elbow 38.

A solution of detergent and water 52 is then supplied until it reaches a level 54 that is above the top of the filter 50 but well below the top of the large plastic collar 48. For a plastic bucket 10 with a six gallon capacity, this level typically requires about five gallons of water. For five gallons of water, a suitable quantity and composition of detergent for cleaning polyester and plastic filters is obtained by adding one cup of Spic 'N' Span TM liquid and one cup of Purex TM liquid. Power is then supplied to the submersible pump 16 and the lid 14 is placed over the top of the plastic bucket 10 to prevent foreign materials from getting into the detergent and water solution 54.

Under the influence of the submersible pump 16, the detergent and water solution 52 now moves from a region in the plastic bucket 10 that is exterior to the filter 50, through the pump 16 and readily disconnectable arrangement of tubing 46, 44, 40, 42, and 38, to a region interior to the small perforated plastic tube 34, through the perforations in the small perforated plastic tube 34 to a region that is exterior to the small perforated plastic tube 34 and interior to the large perforated plastic tube 18, then through the perforations in the large perforated plastic tube 18 to a region that is exterior to the large perforated tube 18 and interior to the filter 50 to be cleaned, and then through the filter 50 to be cleaned and back to the region in the plastic bucket 10 that is exterior to the filter 50, completing the circulation. This flow, from the interior to the exterior of the filter 50, is in the opposite direction from the direction of flow through the filter while it is in normal use.

The size of the submersible pump 16 is chosen to provide a steady, slow current of detergent and water solution 52 through the path just described. Note that with a pumping action that is too strong, a head of pressure would build up in the large plastic collar 48 and the detergent and water solution 52 would flow over the top of the large plastic collar 48. However, for moderate rates of flow and filters that are not totally clogged, only a small head of pressure is required within the filter 50 and large plastic collar 48 to produce a steady, gentle current of the detergent and water solution 52 through the filter 50. In fact, filters 50 are adequately cleansed even if part of the detergent and water solution 52 flows over the filter rather than through it, but the large plastic collar 48 serves the primary function of keeping the filter 50 from floating. Alternative means for accomplishing this function are envisioned, including a pin passing through two of the perforations of the large perforated tube 18.

After about two hours of immersion in this gentle flow of detergent and water solution 52, the filter 50 has been cleansed of all dirt and oils and is ready for removal and rinsing. The filter is removed by a procedure almost identical to the procedure whereby it was put in, namely, the lid 14 is removed from the plastic bucket 10. Short plastic tube 42 is disconnected from plastic tube elbow 38. The plastic elbow 38 and small perforated plastic tube 34 with small plastic cap 36 are lifted out of large perforated tube 18 and temporarily put aside. The short plastic tube 42 and plastic elbow 40 are then rotated on long plastic tube 44 until short plastic tube 42 is at approximately a right angle to the position shown (i.e., pointing into or out of the Figure). The large plastic collar 48 is removed from the top of the large perforated plastic tube 18.

The washed filter 50 is removed and sprayed with a garden hose and nozzle until it is suitably rinsed of detergent. If other filters are to be washed, another filter can now be placed in the plastic bucket around the larger perforated plastic tube 18. As before, the large plastic collar 48 is then put back on the top of the large perforated plastic tube 18. The small perforated plastic tube 34, along with small plastic cap 36 and plastic elbow 38, is then placed inside of the large perforated plastic tube 18. The short plastic tube 42 is then rotated back to the position shown and reconnected to plastic tube elbow 38, the lid 14 is put back on, and the submersible pump 16 activated. It has been found that one detergent and water solution 52, as described above, will satisfactorily clean three to four filters.

It should be noted that disconnecting between the short plastic tube 42 and the plastic elbow 38 is arbitrary. The disconnection can also be made between the short plastic tube 42 and the plastic elbow 40, or between the plastic elbow 40 and the long plastic tube 44. These slideable and rotatable connections are easily connected and disconnected by hand at any junction.

All of the plastic tubes 18, 34, 42 and 44, caps 32 and 36, elbows 38 and 40, and collar 48 are suitably made of PVC pipe supplies, commonly available from hardware stores. The tubes are cut to suitable lengths and sanded as necessary to remove burrs and for ease of connection and disconnection. The rubber elbow 46 was available as an accessory to the submersible pump 16. For a common filter size, the plastic bucket 10 that serves as a tank is a six gallon utility bucket.

The only maintenance required for the apparatus is the cleaning of a screen on the inlet of the submersible pump 16 from time to time, as it collects any fabric or hair that gets into the filter washing apparatus.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

I claim:

1. An apparatus for washing a tubular filter, the filter having an axial aperture and an interior and an exterior, the apparatus comprising:
   a tank;
   a large perforated tube disposed within the tank for holding the axial aperture of the filter;

a submersible pump disposed within the tank, the submersible pump having an inlet and an outlet;

a readily disconnectable arrangement of tubing connected to the outlet of the submersible pump at one end and terminating at an opposite end in a small perforated tube, the small perforated tube for being placed inside of the large perforated tube after the filter has been placed around the large perforated tube.

2. An apparatus according to claim 1 further comprising means for keeping the filter from floating.

3. An apparatus according to claim 2 wherein the means for keeping the filter from floating comprises a large plastic collar fitting over the large perforated tube.

4. An apparatus according to claim 1 wherein the readily disconnectable arrangement of tubing comprises:
- a rubber elbow connected to the outlet of the submersible pump;
- a long plastic tube connected to the rubber elbow;
- a first plastic elbow rotatably connected to the long plastic tube;
- a short plastic tube slideably connected to the first plastic elbow; and
- a second plastic elbow slideably connected to the short plastic tube and to the small perforated tube.

* * * * *